(12) United States Patent
Doya et al.

(10) Patent No.: US 6,529,887 B1
(45) Date of Patent: Mar. 4, 2003

(54) AGENT LEARNING MACHINE

(75) Inventors: Kenji Doya, Kyoto (JP); Mitsuo Kawato, Kyoto (JP)

(73) Assignees: Agency of Industrial Science and Technology, Saitama (JP); Advanced Telecommunication Research Institute International, Kyoto (JP)

( * ) Notice: Subject to any disclaimer, the term of this patent is extended or adjusted under 35 U.S.C. 154(b) by 0 days.

(21) Appl. No.: 09/508,850

(22) PCT Filed: Jul. 8, 1999

(86) PCT No.: PCT/JP99/03689

§ 371 (c)(1),
(2), (4) Date: May 18, 2000

(87) PCT Pub. No.: WO00/04457

PCT Pub. Date: Jan. 27, 2000

(30) Foreign Application Priority Data

Jul. 17, 1998 (JP) ............................... 10-203760

(51) Int. Cl.$^7$ .............................................. G06F 15/18
(52) U.S. Cl. ........................................................ 706/12
(58) Field of Search ............................ 706/12, 14, 903

(56) References Cited

U.S. PATENT DOCUMENTS 5,448,681 A * 9/1995 Khan ........................... 706/23
6,434,540 B1 * 8/2002 Numaoka .................... 706/25

FOREIGN PATENT DOCUMENTS

| JP | 2-226458 | * 10/1990 | ............ G06F/15/16 |
| JP | 2-226459 | * 10/1990 | ............ G06F/15/18 |
| JP | 2-226460 | * 10/1990 | ............ G06F/15/18 |
| JP | 3-105663 | * 2/1991 | ............ G06F/15/18 |
| JP | 3-105664 | * 2/1991 | ............ G06F/15/20 |
| JP | 3-105665 | * 2/1991 | ............ G06F/15/20 |

* cited by examiner

Primary Examiner—John A. Follansbee
Assistant Examiner—Joseph P. Hirl
(74) Attorney, Agent, or Firm—Wenderoth, Lind & Ponack, L.L.P.

(57) ABSTRACT

The invention provides a novel highly-adaptive agent learning machine comprising a plurality of learning modules each having a set of reinforcement learning system which works on an environment and determines an action output for maximizing a reward provided as a result thereof and an environment predicting system which predicts a change in the environment, wherein a responsibility signal is calculated such that the smaller a prediction error of the environment predicting system of each of the learning modules, the larger the value thereof, and the action output by the reinforcement learning system is weighted in proportion to the responsibility signal, thereby providing an action with regard to the environment. The machine switches and combines actions optimum to various states or operational modes of an environment without using any specific teacher signal and performs behavior learning flexibly without using any prior knowledge.

24 Claims, 4 Drawing Sheets

AGENT LEARNING MACHINE

TECHNICAL FIELD

The present invention relates to an agent learning machine. More particularly, the invention relates to a highly-adaptable novel agent learning machine which, in a control of a physical system such as robot, automobile and airplane or in a program for carrying out, instead of human being, information search, user response, resource allocation, market dealing and so on, can deal with nonlinearity or nonstationarity of an environment such as a control object or a system, and can switch or combine, without using prior knowledge, behaviors optimum to various states or modes or the environment, and thus can achieve flexible behavior learning.

BACKGROUND ART

Most of conventional learning systems resolve a problem of "supervised learning" of how to realize a desired output and a time pattern thereof specified by a human being. However, in many problems in the actual world, a correct output is unknown, thus a framework of supervised learning is not applicable.

A system of learning a desired output and a time series thereof by performing, without being taught specifically of what is the correct output, an interactive operation in trial and error with an environment such as a control object has been researched and developed under a framework of "reinforcement learning" (refer to R. Sutton and A. G. Barto, Reinforcement Learning: An Introduction, MIT Press, 1998). In general, as exemplified in FIG. 1, the reinforcement learning system comprises a state evaluator (B) for learning a state evaluation x(t) based on a reward r(t) provided from an environment (A), and an action generator (C) for learning an action output u(t) pertinent to the environment (A) based on the state evaluation x(t).

Heretofore, an algorithm of the reinforcement learning has been applied to a control of a mobile robot or an elevator, an allocation of communication channels or programs of games (refer to R. Sutton and A. G. Barto, Reinforcement Learning: An Introduction, MIT Press, 1998). However, when an action of the environment (A) has nonlinearity, there poses a problem in which the state evaluator (B) or the action generator (C) must carry out approximation of extremely complicated nonlinear functions and a very long period of time is required in learning. Further, when an action of the environment (A) has nonstationarity, learning of optimum behavior cannot be achieved.

Meanwhile, in the field of adaptive control, there has frequently been used a method of preparing multiple control circuits tuned for different operational points or operational modes of the environment and switching these control circuits as occasion demands, with regard to a system having nonlinearity or nonstationarity such as a robot or an airplane. However, according to the conventional method, it is necessary to determine, based on prior knowledge, what control circuits are to be prepared and under what conditions these are to be switched. Thus, the conventional method lacks in adaptability.

Various technologies have been proposed in order to resolve such problems.

For example, there is proposed, in R. A. Jacobs, at al, "Adaptive mixtures of local experts", Neural Computation, 3, 79–87, 1990, a method of realizing approximation of complicated nonlinear functions by weighting and switching outputs from a plurality of multiple layer neural networks by an output of a multiple layer neural network referred to as a gating circuit. Further, there has been proposed, in T. W. Cacciatore and S. J. Nowlan, "Mixtures of controllers for jump linear and non-linear plants." Neural Information Processing Systems, 6, Morgan Kaufmann, 1994 and also in H. Gomi and M. Kawato "Recognition of manipulated objects by motorlearning with modular architecture networks" Neural Networks, 6, 485–497, 1993 and also in Japanese Patent Laid-Open No. 06-19508 and Japanese Patent Laid-Open No. 05-297904, that a multiple layer neural circuit having a gating circuit(D) is applied to adaptive control as exemplified in FIG. 2. However, in reality, it is very difficult to realize learning of respective modules and learning of a gating circuit cooperatively.

Furthermore, there has been proposed a nonlinear control by a pair of predicting circuits and a control circuit in K. Narendra, et al. "Adaptation and learning using multiple models, switching, and tuning" IEEE Control Systems Magazine, June, 37–51, 1995. However, the control is carried out by a single module providing least prediction error and no consideration is given to a flexible combination. Further, all of these assume only a framework of supervised learning and accordingly, the applicable range is limited.

In K. Pawelzik, et al., "Annealed competition of experts for a segmentation and classification of switching dynamics." Neural Computation, 8, 340–356, 1996, there has been proposed combination and switching of prediction modules based on a posterior probability of a signal source. However, no consideration is given to a combination with a control circuit.

The present invention has been invented in view of the foregoing circumstances, and it is an object of the invention to resolve the problem of the conventional technologies and to provide a novel highly-adaptable agent learning machine which can change or combine, without being provided any specific teacher signal, behaviors optimum to states of operational modes of various environments and perform behavior learning flexibly without using prior knowledge, in an environment having nonlinearity or nonstationarity, such as a control object or a system.

DISCLOSURE OF THE INVENTION

In order to solve the foregoing problems, the present invention provides an agent learning machine comprising a plurality of learning modules each comprising a set of a reinforcement learning system for working on an environment and determining an action output for maximizing a reward provided as a result thereof, and an environment predicting system for predicting a change in the environment, wherein there are calculated responsibility signals each having a value such that the smaller a prediction error of the environment predicting system of each of the learning modules, the larger the value, and the output of the reinforcemnt learning system is weighted in proportion to the responsibility signal to thereby provide the action to the environment.

According to a second aspect of the invention, there is provided the agent learning machine wherein learning of either or both of the reinforcement learning system and the environment predicting system of the learning module is carried out in proportion to the responsibility signal.

According to a third aspect of the invention, there is provided the agent learning machine wherein a reinforcement learning algorithm or a dynamic programming algorithm is used in learning the reinforcement learning system.

According to a fourth aspect of the invention, there is provided the agent learning machine wherein a supervised learning algorithm is used in learning the environment predicting system.

According to a fifth aspect of the invention, there is provided the agent learning machine wherein the reinforcement learning system includes a state evaluator and an action generator.

According to a sixth aspect of the invention, there is provided the agent learning machine, wherein at least one of a linear model, a polynomial model and a multiple layer neural network is used as means for approximating a function of the state evaluator.

According to a seventh aspect of the invention, there is provided the agent learning machine wherein at least one of a linear model, a polynomial model and a multiple layer neural network is used as means for approximating a function of the action generator.

According to an eighth aspect of the invention, there is provided the agent learning machine wherein the environment predicting system includes either or both of the state predictor and a responsibility signal predictor.

According to a ninth aspect of the invention, there is provided the agent learning machine wherein at least one of a linear model, a polynomial model and a multiple layer neural network is used as means for approximating a function of the state predictor.

According to a tenth aspect of the invention, there is provided the agent learning machine wherein at least one of a linear model, a polynomial model and a multiple layer neural network is used as means for approximating a function of the responsibility signal predictor.

Figure 1:
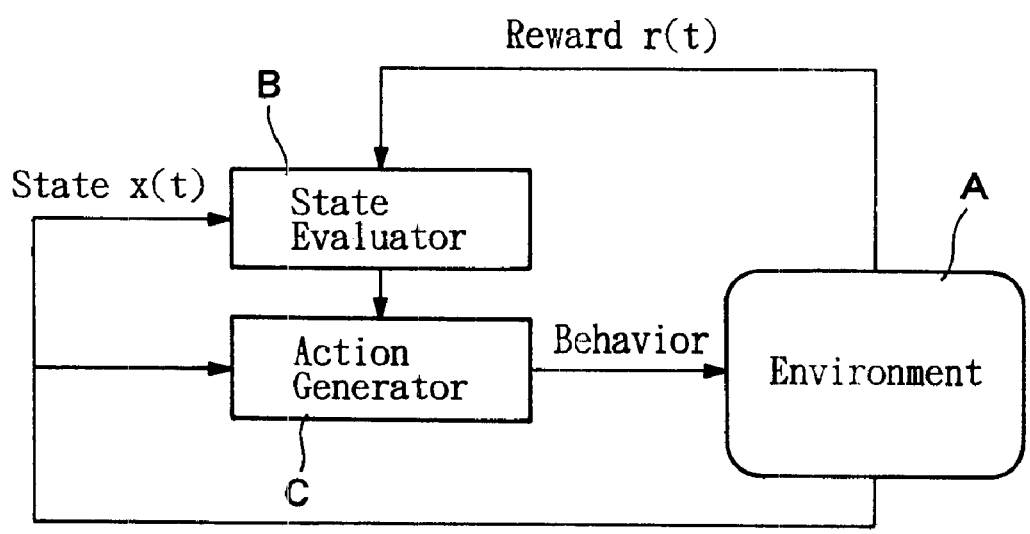
FIG. 1 is a schematic diagram showing an example of a conventional reinforcement learning system.
Figure 2:
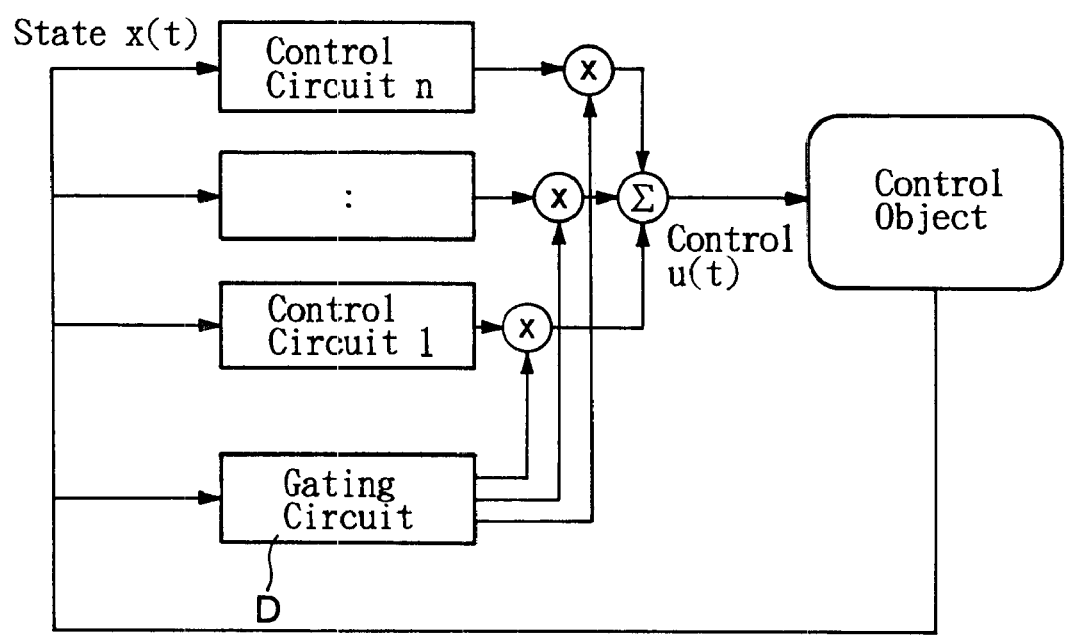
FIG. 2 is a schematc diagram showing an example of a conventional adaptive control by a multiple layer neural network having a gating network.

Notations in the drawings designate as follows:
1: Reinforcement learning system;
11: State evaluator;
12: Action generator;
2: Environment predicting system;
21: State predictor;
22: Responsibility signal predictor;
3: Learning module;
4: Environment;
5: Crane;
51: Carriage;
52: Arm;
53: Load.

BEST MODE FOR CARRYING OUT THE INVENTION

Figure 3:
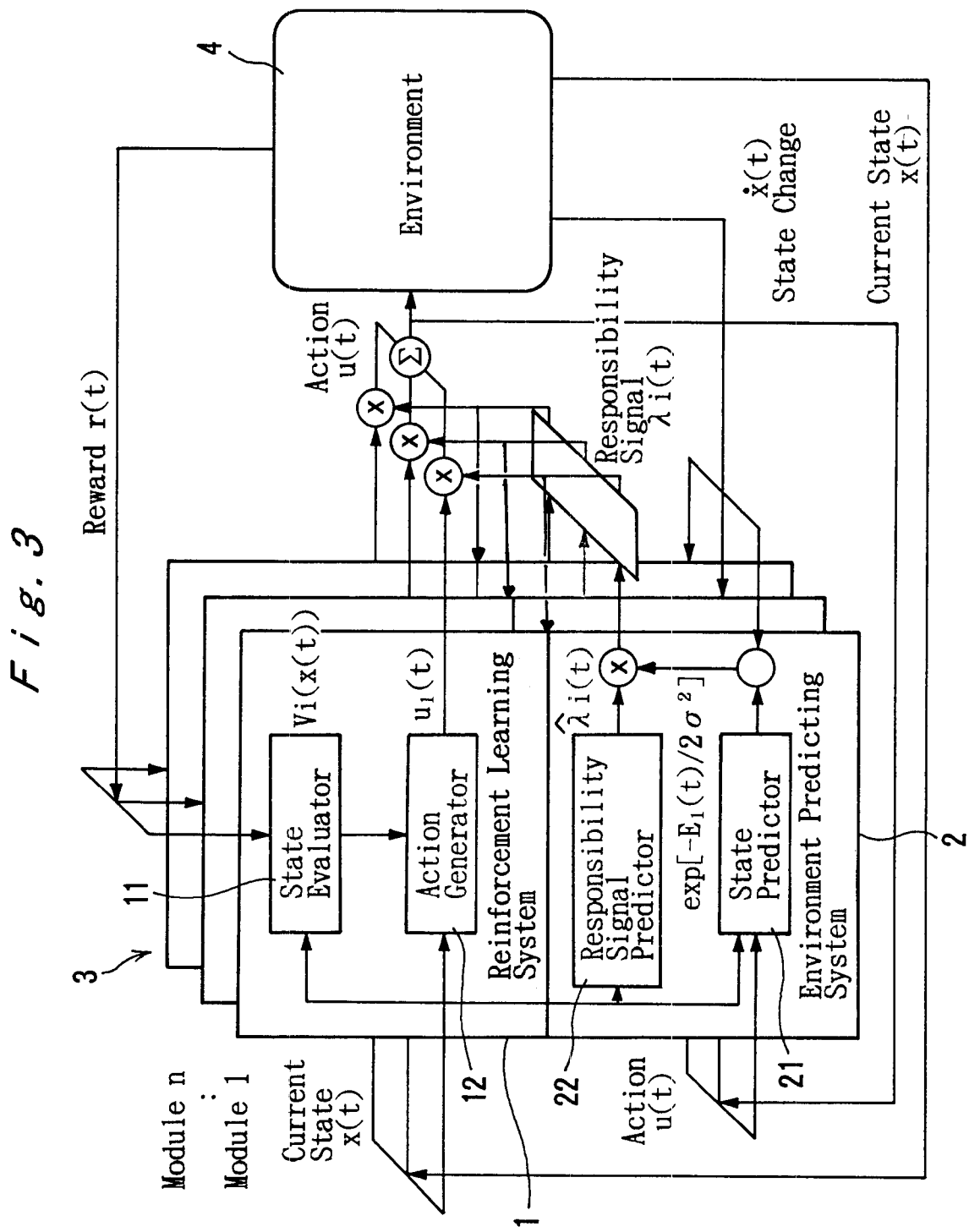
FIG. 3 is a schematic diagram exemplifying each processing in an agent learning machine according to the present invention.

FIG. 3 is an schematic diagram showing an example of an agent learning machine according to the invention.

For example, as shown in FIG. 3, according to the agent learning machine of the invention, there are provided "n" sets of learning modules (3) each comprising a set of a reinforcement learning system (1) which works on an environment (4) and determine an action output for maximizing the reward provided as a result thereof and an environment predicting system (2) which predicts a change of the environment (4).

The reinforcement learning system (1) in each of the learning modules (3) is provided with a state evaluator (11) and an action generator (12). The state evaluator (11) of each of the reinforcement learning system (1) predicts a weighted expected value $V_i(x(t))$ of a reward provided for the future by using a current state, that is, a current state ($x(t)$) of the environment (4). Each of the action generators (12) provides an action output $u_i(t)$ such that a sum of a reward r(t) immediately provided and the weighted expected value $V_i(x(t))$ of the reward by the state evaluator (11) is maximized. Incidentally, i=1, 2 . . . n (the same as follows).

In learning of the reinforcement learning system (1), there is used, for example, a reinforcement learning algorithm or a dynamic programming algorithm such as Actor-Critic, Q learning, real time Dynamic Programming or linear quadratic type control circuit (LQR) (refer to R. Sutton and A. G. Barto, Reinforcement Learning: An Introduction, MIT Press, 1998 as well as D. P. Bertsekas and J. N. Tsitsiklis, Neuro-Dynamic Programming, Athena Scientific, 1996).

The environment predicting system (2) is provided with, for example, a state predictor (21) and may further be provided with a responsibility signal predictor (22). Each of the environment predictors (21) predicts a state change x(t) of the environment (4) by using the current state x(t) and the action output u(t). Each of the responsibility signal predictors (22) predicts a responsibility signal $\lambda_i(t)$ of the current state x(t). In learning, for example, a supervised learning algorithm is used.

Each of the state evaluator (11), the action generator (12), the state predictor (21) and the responsibility signal predictor (22) can use a single or a combination of, for example, a linear model, a polynomial model, or a multiple layer neural network as means for function approximation.

In addition, it is preferable that the learning of either or both of the reinforcement learning system (1) and the environment predicting system (2) in each of the learning modules (3) is carried out in proportion to the responsibility signal.

Further, in the respective learning modules (3) (I=1, 2, . . . n) each comprising the set of the reinforcement learning system (1) and the environment predicting system (2) described above, the responsibility signal $\lambda_i(t)$ is calculated such that the smaller the prediction error of the environment predicting system (2), the larger the value thereof, and the action output $u_i(t)$ by the reinforcement learning system (1) is weighted in proportion to the responsibility signal $\lambda_i(t)$, thereby providing the action u(t) to the environment (4).

By the weighting in proportion to the responsibility signal $\lambda_i(t)$, it is determined whether what way the output of which one of the learning modules (3) is to be selected or combined at respective time points or at what rate the learning of each of the learning modules (3) is to be carried out, thereby providing the most suitable action u(t) to the environment (4).

Further explaining, for example, each process is carried out as follows.

I) The responsibility signal $\lambda_i(t)$ is calculated in accordance with a magnitude of the prediction error of the state change x(t) by the state predictor (21), that is, an error of a predicted model of the state predictor (21), of the environment predicting system (2) in each of the learning modules (3).

More specifically, firstly, when responsibility predictor (22) is not provided in the environment predicting system (2), the state change x(t) of the environment (4) is predicted by the state predictor (21) of each of the learning modules (3), and the responsibility signal $\lambda_i(t)$ is calculated by the following equation based on a short time period average value $E_i(t)$ of the predicted square errors of these, $$\lambda_i(t) = \frac{e^{-\frac{E_i(t)}{2\sigma^2}}}{\sum_{j=1}^{n} e^{-\frac{E_j(t)}{2\sigma^2}}} \qquad (1)$$

wherein $\sigma$ is a parameter for designating a width of an allocated range of each of the learning modules (3).

Thereby, the smaller the prediction error of the environment predicting system (2) is, the larger the value of the responsibility signal $\lambda_i(t)$ is provided.

II) The action outputs $u_i(t)$ of the respective action generators (12) are summed up by weightings in proportions to the responsibility signals $\lambda_i(t)$, thereby providing the action u(t) with respect to the environment (4).

III) Learning of each of the environment predicting systems (2) is carried out with an intensity in proportion to the responsibility signal $\lambda_i(t)$.

IV) Learning of each of the reinforcement learning systems (1) is carried out with an intensity in proportion to the responsibility signal $\lambda_i(t)$.

By repeating the above-described process, switching and combination among the respective learning modules (3) and also the reinforcement learning systems (1) and the environment predicting systems (2) in the respective learning modules (3) are together optimized in the form of maintaining integrated performance and in correspondence with different states, operational points or operational modes in the environment (4) having nonlinearity or nonstationarity, such as of a system or a control object. Thus, flexible behavior learning is carried out without using prior knowledge and an action suitable for the environment (4) is provided.

Further, when the environment predicting system (2) is provided with the responsibility signal predictor (22), the predicted value of the responsibility signal is calculated based on the current state x(t) of the environment (4) and then the responsibility signal $\lambda_i(t)$ is calculated with the following equation, in place of the above-described Equation (1), based on the predicted value and an actual average prediction error, that is, the short time period average value $E_i(t)$ of the predicted square error mentioned above.

$$\lambda_i(t) = \frac{\hat{\lambda}_i(t) e^{-\frac{E_i(t)}{2\sigma^2}}}{\sum_{j=1}^{n} \hat{\lambda}_j(t) e^{-\frac{E_j(t)}{2\sigma^2}}} \qquad (2)$$

wherein $\hat{\lambda}_i(t)$ is a predicted value of the responsibility signal.

Each of the responsibility predictors (22) learns with this $\lambda_i(t)$ as a teacher signal.

Thereby, optimum switching or combination of behavior is carried out and further flexible behavior learning can be achieved.

A further detailed explanation will be given of embodiments of the invention by describing examples in reference to the drawings as follows.

EXAMPLE

In the agent learning machine exemplified in FIG. 1, firstly, as means for function approximation of the state predictor (21) in the environment predicting system (2) of each of the learning modules (3), there is used a local linear model given by the following equation.

$$\hat{\dot{x}}(t) = A_i(x(t) - x_i) + B_i u(t) \qquad (3)$$

With this model, the predicted value of the state change $\dot{x}(t)$ of the control object, which is the environment (4), is calculated.

Each of the reinforcement learning systems (1) is provided with a quadratic type model of the reward given by the following equation.

$$\hat{r}_i(x, u) = -\frac{1}{2}(x(t) - x_i)' Q_i (x(t) - x_i) - \frac{1}{2} u'(t) R u(t) \qquad (4)$$

Further, the weighted expected value $V_i(x(t))$ of the reward which is the output of the state evaluator (11) is given by using a solution Pi of the Riccati equation as follows.

$$0 = -P_i A_i - A_i' P_i + P_i B_i R^{-1} B_i' P_i - Q_i \qquad (5)$$

$$V_i(x(t)) = -\frac{1}{2}(x(t) - x_i)' P_i (x(t) - x_i) \qquad (6)$$

Further, the action output $u_i(t)$ of the action generator (12) is given by the following equation.

$$u_i(t) = -R^{-1} B_i' P_i (x(t) - x_i) \qquad (7)$$

In this embodiment, it is assumed that the responsibility signal predictor (22) is not used. In addition, it is assumed that the environment (4) is the control object, and hence, the action u(t) in respect of the environment (4) is a control command to the control object.

In each of the learning modules (3) constituted as above, the learning is carried out by repeating respective steps I) through IV) shown below at $t = \Delta t, 2\Delta t \ldots$, after performing initialization such as the average prediction error $E_i(0) = 0$, responsibility signal $\lambda_i(0) = 1/n$, behavior output u(t) = 0 at t = 0.

I) Firstly, the responsibility signal is calculated as follows.

a) In each of the learning modules (3), the state change $\dot{x}(t)$ is predicted by the local linear model of the above-described equation 3 in the state predictor (21), and a general prediction of the state change is calculated by weighting those state changes as the following equation.

$$\hat{\dot{x}}(t) = \sum_{i=1}^{n} \lambda_i(t) \hat{\dot{x}}_i(t) \qquad (8)$$

b) The short term average of the error of the output of the respective state predictors (21), that is, the output of the local linear model which is the prediction model is calculated by the following equation.

$$\tau_R \frac{d}{dt} E_i(t) = -E_i(t) + \left\| \dot{x}(t) - \hat{\dot{x}}_i(t) \right\|^2 \qquad (9)$$

where $\tau_R$ designates a time constant of evaluation.

c) Further, the responsibility signal $\lambda_i(t)$ of each of the modules is calculated by the above-described Equation 1.

II) The action output $u_i(t)$ of each of the action generators (12) is calculated by the above-described Equation 7 and the action u(t) constituting the control instruction to the control object is calculated by the weighted sum proportional to the responsibility signal $\lambda_i(t)$ as the following equation.

$$u(t) = \sum_{i=1}^{u} \lambda_i(t) u_i(t) \tag{10}$$

III) Learning of the environment predicting system (2) is carried out. The parameters of the linear prediction mode are updated as follows.

$$\frac{d}{dt} A_i = \varepsilon \lambda_i(t)(\dot{x}(t) - \hat{\dot{x}}_i(t))x' \tag{11}$$

$$\frac{d}{dt} B_i = \varepsilon \lambda_i(t)(\dot{x}(t) - \hat{\dot{x}}_i(t))u' \tag{12}$$

IV) Learning of the reinforcement learning system (1) is carried out.

a) The parameters of the reward model are updated as follows.

$$\frac{d}{dt} Q_i = -\varepsilon \lambda_i(t)(r(t) - \hat{r}_i(t))(x - x_i)(x - x_i)' \tag{13}$$

$$\frac{d}{dt} x_i = \varepsilon \lambda_i(t)(r(t) - \hat{r}_i(t))(x - x_i) Q_i \tag{14}$$

$$\frac{d}{dt} R_i = -\varepsilon \lambda_i(t)(r(t) - \hat{r}_i(t)) uu' \tag{15}$$

b) The Riccati equation given by the above-described equation 5 is solved based on the linear prediction model and the reward model which have been updated.

As described above, without using prior knowledge, switching and combination of the action outputs $u_i(t)$ of the action generators (12) are optimized, thus there is provided the action u(t) constituting the control command optimum to various states and operational modes of the control object having nonlinearity or nonstationarity.

When the definition of the above-described reward, that is, $Q_i$, $x_i$, $R_i$ are already known, step IV)-a) can be omitted. Further, when the model is updated gradually, the solution of the Riccati equation at step IV)-b) needs not to be solved at every step.

Figure 4:
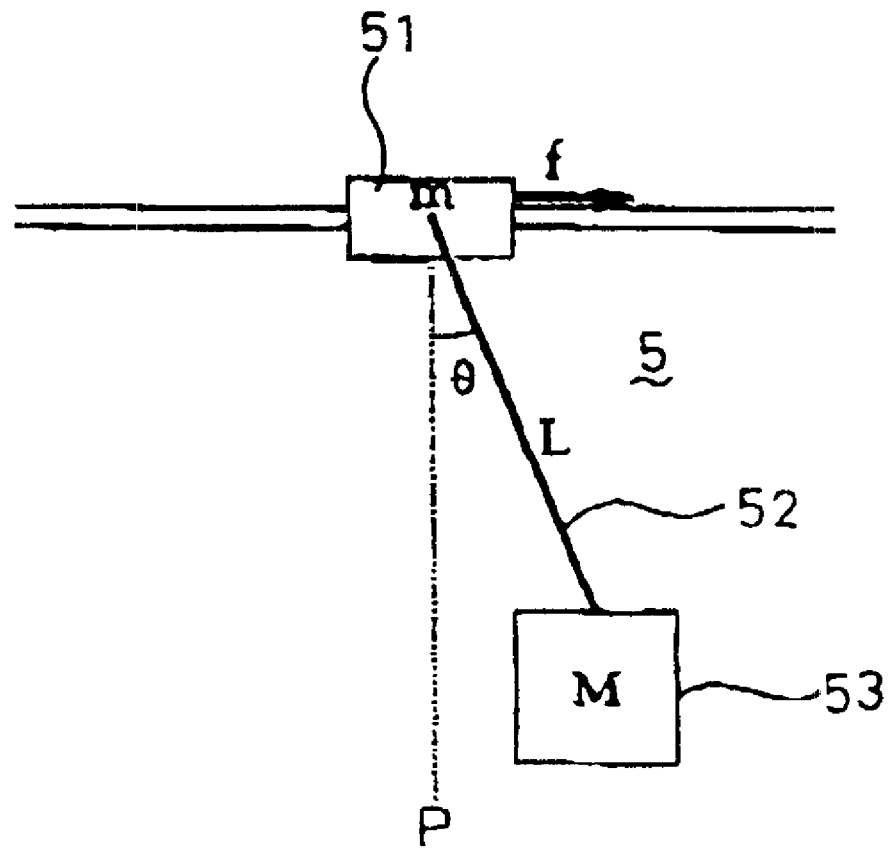
FIG. 4 is an schematic diagram showing an example of a crane constituting a control object.

Here, for example, by the agent learning system according to the invention described above, control of a crane (5) exemplified in FIG. 4 is performed using the above-described linear quadratic model.

The crane (5) comprises a carriage (51) having a mass m=1 (kg), an arm (52) having length L(m) and a load (53) having a mass M (kg).

State variables in the crane (5) are designated by $x=(P, \dot{P}, \theta, \dot{\theta})$ respectively representing position and velocity of the carriage (51) and angle and angular velocity of the arm (52). Further, behavior u(t)=f constitutes the drive force of the carriage.

In a control trial, a target position P* of the crane (5) is randomly set at an interval of 3 seconds in a range of ±1 (m). It is assumed that in operation of 3 steps, the mass M of the load (53) and the length L of the arm (52) are changed to one of three sets of values of $S_1$, $S_2$ and $S_3$ indicated by Table 1 shown below.

The learning modules (3) of n=3 sets are prepared to the agent learning machine, an experiment of learning control described above is performed under a state of parameters of reward of $x_i=(P^*, 0, 0, 0)$, Q=diag(1, 0, 1, 0) and R=0.01. The parameters of learning are set as $\tau_R=0.1$ and $\eta=0.1$.

Further, the scale σ of the prediction error constituting a parameter which designates the width of the allocated range of each of the learning modules (3) is reduced with progress of learning by the average prediction error at a preceding trial.

The respective learning modules (3) after 500 trials are differentiated to substantially correspond to the crane states $S_1$, $S_2$, $S_3$. A comparison between a value of feedback gain of each of the action generator (12) and a value of theoretical optimum gain thereof is shown by the following Table 1.

TABLE 1

|   | M (Kg) | L (m) | Theoretical optimum gain | $(\lambda_1 \lambda_2 \lambda_3)$ | Gain after learning |
|---|---|---|---|---|---|
| $S_1$ | 1.0 | 0.5 | (10.0, 7.2, 6.1, −0.3) | (0.9, 0.00, 0.01) | (10.0, 7.3, 6.0, −0.3) |
| $S_2$ | 10.0 | 0.5 | (10.0, 14.8, 0.1, −3.7)) | (0.00, 0.39, 0.61) | (10.7, 15.0, 4.5, −1.7) |
| $S_3$ | 10.0 | 1.0 | (10.0, 14.7, −2.0, −8.3) | (0.00, 0.61, 0.39) | (11.0, 15.7, 2.9, −2.7) |

Here, the four values of the theoretical optimum gain in Table 1 respectively represent four elements (gain of position, velocity, angle, angular velocity) of feedback gain matrix $R^{-1} B_i' P_i$ of the action output (Equation 7) provided by solving the Riccati equation (Equation 5) with the use of true values analytically calculated in $A_i$, $B_i$. The gain after learning represents average values given by the following equation, under the respective conditions $S_1$, $S_2$, $S_3$, of four elements of the feedback gain matrix calculated by Equation 5, Equation 7, Equation 10 from $A_i$, $B_i$ provided by learning.

$$\sum_{i=1}^{3} \bar{x}_i R^{-1} B_i' P_i \tag{16}$$

Further, $(\bar{\lambda}_1, \bar{\lambda}_2, \bar{\lambda}_3)$ are average values of the responsibility signals by the respective learning modules (3).

As is apparent from Table 1, the feedback gain of the action generator (12) acquired by learning in accordance with the agent learning machine of the invention is getting very close to the theoretical optimum feedback gain in the respective crane states. That is, by the present invention, flexible behavior learning is realized and optimum control can be carried out with regard to various states and operational modes of the crane (5).

Of course, the invention is not limited to the above-described examples, and ovarious embodiments are feasible with regard to detailed portions thereof.

INDUSTRIAL APPLICABILITY

As has been described in details, according to the invention, there is provided a novel highly-adaptable agent learning machine which, in an environment having nonlinearity or nonstationarity such as a control object or a system, switches and combines behaviors optimum to various states or operational modes of an environment without using any specific teacher signal and performs behavior learning flexibly without using any prior knowledge.

What is claimed is:

1. An agent learning machine comprising:

a plurality of learning modules each having a set of a reinforcement learning system which works on an environment and determines an action output for maximizing a reward given as a result thereof and an environment predicting system which predicts a change of the environment;

wherein a responsibility signal is calculated such that the smaller a prediction error of the environment predicting system of each of the learning modules, the larger the value thereof, and the action output by the reinforcement learning system is weighted in proportion to the responsibility signal, thereby providing an action with regard to the environment.

2. The agent learning machine according to claim 1, wherein learning of either or both of the reinforcement learning system and the environment predicting system of the learning module is carried out in proportion to the responsibility signal.

3. The agent learning machine according to claim 1, wherein a reinforcement learning algorithm or a dynamic programming algorithm is used in learning of the reinforcement learning system.

4. The agent learning machine according to claim 1, wherein a supervised learning algorithm is used in learning of the environment predicting system.

5. The agent learning machine according to claim 1, wherein the reinforcement learning system has a state evaluator and an action generator.

6. The agent learning machine according to claim 5, wherein at least one of a linear model, a polynomial model and a multiple layer neural network approximates the function of the state evaluator.

7. The agent learning machine according to claim 5, wherein at least one of a linear model, a polynomial model and a multiple layer neural network approximates the function of the action generator.

8. The agent learning machine according to claim 1, wherein the environment predicting system has either or both of a state predictor and a responsibility signal predictor.

9. The agent learning machine according to claim 8, wherein at least one of a linear model, a polynomial model and a multiple layer neural network approximates the function of the state predictor.

10. The agent learning machine according to claim 8, wherein at least one of a linear model, a polynomial model and a multiple layer neural network approximates the function of the responsibility signal predictor.

11. The agent learning machine according to claim 2, wherein a reinforcement learning algorithm or a dynamic programming algorithm is used in learning of the reinforcement learning system.

12. The agent learning machine according to claim 2, wherein a supervised learning algorithm is used in learning of the environment predicting system.

13. The agent learning machine according to claim 3, wherein a supervised learning algorithm is used in learning of the environment predicting system.

14. The agent learning machine according to claim 2, wherein the reinforcement learning system has a state evaluator and an action generator.

15. The agent learning machine according to claim 3, wherein the reinforcement learning system has a state evaluator and an action generator.

16. The agent learning machine according to claim 4, wherein the reinforcement learning system has a state evaluator and an action generator.

17. The agent learning machine according to claim 6, wherein at least one of a linear model, a polynomial model and a multiple layer neural network approximates the function of the action generator.

18. The agent learning machine according to claim 2, wherein the environment predicting system has either or both of a state predictor and a responsibility signal predictor.

19. The agent learning machine according to claim 3, wherein the environment predicting system has either or both of a state predictor and a responsibility signal predictor.

20. The agent learning machine according to claim 4, wherein the environment predicting system has either or both of a state predictor and a responsibility signal predictor.

21. The agent learning machine according to claim 5, wherein the environment predicting system has either or both of a state predictor and a responsibility signal predictor.

22. The agent learning machine according to claim 6, wherein the environment predicting system has either or both of a state predictor and a responsibility signal predictor.

23. The agent learning machine according to claim 7, wherein the environment predicting system has either or both of a state predictor and a responsibility signal predictor.

24. The agent learning machine according to claim 9, wherein at least one of a linear model, a polynomial model and a multiple layer neural network approximates the function of the responsibility signal predictor.

* * * * *